(12) United States Patent
Rosenberg

(10) Patent No.: US 6,686,901 B2
(45) Date of Patent: *Feb. 3, 2004

(54) ENHANCING INERTIAL TACTILE FEEDBACK IN COMPUTER INTERFACE DEVICES HAVING INCREASED MASS

(75) Inventor: Louis B. Rosenberg, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/771,116

(22) Filed: Jan. 26, 2001

(65) Prior Publication Data

US 2001/0026264 A1 Oct. 4, 2001

Related U.S. Application Data

(63) Continuation-in-part of application No. 09/563,783, filed on May 2, 2000, now Pat. No. 6,353,427, which is a continuation-in-part of application No. 09/456,887, filed on Dec. 7, 1999, now Pat. No. 6,211,861, which is a continuation of application No. 09/103,281, filed on Jun. 23, 1998, now Pat. No. 6,088,019.

(51) Int. Cl.[7] .................................................. G09G 5/00
(52) U.S. Cl. ....................................................... 345/156
(58) Field of Search .................................. 345/156, 163, 345/161, 164, 157, 167, 168

(56) References Cited

U.S. PATENT DOCUMENTS

| | | |
|---|---|---|
| 2,972,140 A | 2/1961 | Hirsch |
| 3,157,853 A | 11/1964 | Hirsch |
| 3,220,121 A | 11/1965 | Cutler |
| 3,497,668 A | 2/1970 | Hirsch |
| 3,517,446 A | 6/1970 | Corlyon et al. |
| 3,623,064 A | 11/1971 | Kagan |
| 3,902,687 A | 9/1975 | Hightower |
| 3,903,614 A | 9/1975 | Diamond et al. |
| 3,911,416 A | 10/1975 | Feder |

(List continued on next page.)

FOREIGN PATENT DOCUMENTS

EP 0349086 1/1990

OTHER PUBLICATIONS

Baigrie, "Electric Control Loading—A Low Cost, High Performance Alternative," Proceedings, pp. 247–254, Nov. 6–8, 1990.

Iwata, Pen–based Haptic Virtual Environment, 0–7803–1363–1/93 IEEE, pp 287–292, 1993.

Russo, "The Design and Implementation of a Three Degree of Freedom Force Outoput Joystick," MIT Libraries Archives Aug. 14, 1990, pp. 1–131, May 1990.

(List continued on next page.)

Primary Examiner—Richard Hjerpe
Assistant Examiner—Ronald Laneau
(74) Attorney, Agent, or Firm—Kilpatrick Stockton LLP

(57) ABSTRACT

Method and apparatus for enhancing inertial tactile feedback in computer interface devices having an increased mass, such as wireless devices having the increased mass due to batteries or other power storage elements. A haptic feedback control device is in communication with a host computer and includes a housing, a sensor device that detects movement of a manipulandum or the housing, an actuator that outputs an inertial force transmitted through said housing to said user by moving an inertial mass, and a component, such as a power storage element coupled to the housing to provide power to the actuator. The component or power storage element is inertially decoupled from the housing to reduce the mass of the haptic feedback device with respect to the inertial mass, thereby allowing stronger haptic sensations to be experienced by the user for a given size of the inertial mass.

63 Claims, 7 Drawing Sheets

U.S. PATENT DOCUMENTS

| | | |
|---|---|---|
| 4,160,508 A | 7/1979 | Salsbury |
| 4,236,325 A | 12/1980 | Hall et al. |
| 4,262,549 A | 4/1981 | Schwellenbach |
| 4,333,070 A | 6/1982 | Barnes |
| 4,464,117 A | 8/1984 | Forest |
| 4,484,191 A | 11/1984 | Vavra |
| 4,513,235 A | 4/1985 | Acklam et al. |
| 4,581,491 A | 4/1986 | Boothroyd |
| 4,599,070 A | 7/1986 | Hladky et al. |
| 4,708,656 A | 11/1987 | De Vries et al. |
| 4,713,007 A | 12/1987 | Alban |
| 4,794,392 A | 12/1988 | Selinko |
| 4,891,764 A | 1/1990 | McIntosh |
| 4,896,554 A * | 1/1990 | Culver ................. 74/471 XY |
| 4,930,770 A | 6/1990 | Baker |
| 4,934,694 A | 6/1990 | McIntosh |
| 5,019,761 A | 5/1991 | Kraft |
| 5,022,384 A | 6/1991 | Freels |
| 5,022,407 A | 6/1991 | Horch et al. |
| 5,035,242 A | 7/1991 | Franklin |
| 5,038,089 A | 8/1991 | Szakaly |
| 5,078,152 A | 1/1992 | Bond |
| 5,165,897 A | 11/1992 | Johnson |
| 5,175,459 A | 12/1992 | Danial et al. |
| 5,186,629 A * | 2/1993 | Rohen ........................ 434/114 |
| 5,186,695 A | 2/1993 | Mangseth et al. |
| 5,212,473 A | 5/1993 | Louis |
| 5,240,417 A | 8/1993 | Smithson et al. |
| 5,271,290 A | 12/1993 | Fischer |
| 5,275,174 A | 1/1994 | Cook |
| 5,283,970 A | 2/1994 | Aigner |
| 5,299,810 A | 4/1994 | Pierce |
| 5,309,140 A | 5/1994 | Everett |
| 5,334,027 A | 8/1994 | Wherlock |
| 5,436,622 A | 7/1995 | Gutman et al. |
| 5,437,607 A | 8/1995 | Taylor |
| 5,466,213 A | 11/1995 | Hogan |
| 5,547,382 A | 8/1996 | Yamasaki |
| 5,575,761 A | 11/1996 | Hajianpour |
| 5,766,016 A | 6/1998 | Sinclair |
| 5,785,630 A | 7/1998 | Bobick et al. |
| 5,831,408 A * | 11/1998 | Jacobus et al. ......... 318/568.11 |
| 5,880,714 A * | 3/1999 | Rosenberg et al. ......... 345/156 |
| 5,914,705 A * | 6/1999 | Johnson et al. ............. 345/163 |
| 5,990,869 A * | 11/1999 | Kubica et al. .............. 345/163 |
| 6,111,577 A | 8/2000 | Zilles et al. |
| 6,160,489 A | 12/2000 | Perry et al. |
| 6,219,034 B1 | 4/2001 | Elbing et al. |
| 6,422,941 B1 | 7/2002 | Thorner et al. |
| 6,496,348 B2 * | 12/2002 | McIntosh .................... 361/115 |

OTHER PUBLICATIONS

Brooks et al., "Hand Controllers for Teleoperation—A State-of-the-Art Technology Survey and Evaluation," JPL Publication 85–11; NASA–CR–175890; N85–28559, pp. 1–84, Mar. 1, 1985.

Jones et al., "A perceptual analysis of stiffness," ISSN 0014–4819 Springer International (Springer–Verlag); Experimental Brain Research, vol. 79, No. 1, pp. 150–156, 1990.

Burdea et al., "Distributed Virtual Force Feedback, Lecture Notes for Workshop on Force Display in Virtual Environments and its Application to Robotic Teleoperation," 1993 IEEE International conference on Robotics and Automation, pp. 25–44, May 2, 1993.

Snow et al., "Model–X Force–Reflecting–Hand–Controller," NT Control No. MPO–17851; JPL Case No. 5348, pp. 1–4, Jun. 15, 1989.

Ouh–Young, "Force Display in Molecular Docking," Order No. 9034744, p. 1–369, 1990.

Tadros, Control System Design for a Three Degree of Freedom Virtual Environment Simulator Using Motor/Brake Pair Actuators, MIT Archive © Massachusetts Institute of Technology, pp. 1–88, Feb. 1990.

Caldwell et al., "Enhanced Tactile Feedback (Tele–Taction) Using a Multi–Functional Sensory System," 1050–4729/93, pp. 955–960, 1993.

Adelstein, "Design and Implementation of a Force Reflecting Manipulandum for Manual Control research," DSC–vol. 42, Advances in Robotics, Edited by H. Kazerooni, pp. 1–12, 1992.

Gotow et al., "Controlled Impedance Test Apparatus for Studying Human Interpretation of Kinesthetic Feedback," WA11–11:00, pp. 332–337.

Stanley et al., "Computer Simulation of Interacting Dynamic Mechanical Systems Using Distributed Memory Parallel Processors," DSC–vol. 42, Advances in Robotics, pp. 55–61, ASME 1992.

Russo, "Controlling Dissipative Magnetic Particle Brakes in Force Reflective Devices," DSC–vol. 42, Advances in Robotics, pp. 63–70, ASME 1992.

Kontarinis et al., "Display of High–Frequency Tactile Information to Teleoperators," Telemanipulator Technology and Space Telerobotics, Won S. Kim, Editor, Proc. SPIE vol. 2057, pp. 40–50, Sep. 7–9, 1993.

Patrick et al., "Design and Testing of A Non–reactive, Fingertip, Tactile Display for Interaction with Remote Environments," Cooperative Intelligent Robotics in Space, Rui J. deFigueiredo et al., Editor, Proc. SPIE vol. 1387, pp. 215–222, 1990.

Adelstein, "A Virtual Environment System For The Study of Human Arm Tremor," Ph.D. Dissertation, Dept. of Mechanical Engineering, MIT, Jun. 1989.

Bejczy, "Sensors, Controls, and Man–Machine Interface for Advanced Teleoperation," Science, vol. 208, No. 4450, pp. 1327–1335, 1980.

Bejczy, "Generalization of Bilateral Force–Reflecting Control of Manipulators," Proceedings Of Fourth CISM–IFToMM, Sep. 8–12, 1981.

McAffee, "Teleoperator Subsystem/Telerobot Demonstrator: Force Reflecting Hand Controller Equipment Manual," JPL D–5172, pp. 1–50, A1–A36, B1–B5, C1–C36, Jan. 1988.

Minsky, "Computational Haptics: The Sandpaper System for Synthesizing Texture for a Force–Feedback Display," Ph.D. Dissertation, MIT, Jun. 1995.

Jacobsen et al., "High Performance, Dextrous Telerobotic Manipulator With Force Reflection," Intervention/ROV '91 Conference & Exposition, Hollywood, Florida, May 21–23, 1991.

Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30–Oct. 1, 1992.

IBM Technical Disclosure Bulletin, "Mouse Ball–Actuating Device With Force and Tactile Feedback," vol. 32, No. 9B, Feb. 1990.

Terry et al., "Tactile Feedback In A Computer Mouse," Proceedings of fourteenth Annual Northeast Bioengineering Conference, University of New Hampshire, Mar. 10–11, 1988.

Howe, "A Force–Reflecting Teleoperated Hand System for the Study of Tactile Sensing in Precision Manipulation," Proceedings of the 1992 IEEE International Conference on Robotics and Automation, Nice, France, May 1992.

Eberhardt et al., "OMAR–13 A Haptic display for speech perception by deaf and deaf–blind individuals," IEEE Virtual Reality Annual International Symposium, Seattle, WA, Sep. 18–22, 1993.

Rabinowitz et al., "Multidimensional tactile displays: Identification of vibratory intensity, frequency, and contactor area," Journal of The Acoustical Society of America, vol. 82, No. 4, Oct. 1987.

Bejczy et al., "Kinesthetic Coupling Between Operator and Remote Manipulator," International Computer Technology Conference, The American Society of Mechanical Engineers, San Francisco, CA, Aug. 12–15, 1980.

Bejczy et al., "A Laboratory Breadboard System For Dual–Arm Teleoperation," SOAR '89 Workshop, JSC, Houston, TX, Jul. 25–27, 1989.

Ouh–Young, "A Low–Cost Force Feedback Joystick and Its Use in PC Video Games," IEEE Transactions on Consumer Electronics, vol. 41, No. 3, Aug. 1995.

Marcus, "Touch Feedback in Surgery," Proceedings of Virtual Reality and Medicine The Cutting Edge, Sep. 8–11, 1994.

Bejczy, et al., "Universal Computer Control System (UCCS) For Space Telerobots," CH2413–3/87/0000/0318501.00 1987 IEEE, 1987.

Patrick, "Design, Constructin, and Testing of a Fingertip Tactile Display for Interaction with Virtual and Remote Environments," Master of Science Thesis, MIT, Nov. 8, 1990.

Cadler, "Design of A Force–Feedback Touch–Introducing Actuator For Teleoperator Robot Control," Bachelor of Science Thesis, MIT, Jun. 23, 1983.

Wiker, "Teletouch Display Development: Phase 1 Report," Technical Report 1230, Naval Ocean Systems Center, San Diego, Apr. 17, 1989.

Bliss, "Optical–to–Tactile Image Conversion for the Blind," IEEE Transactions on Man–Machine Systems, vol. MMS–11, No. 1, Mar. 1970.

Johnson, "Shape–Memory Alloy Tactile Feedback Actuator," Armstrong Aerospace Medical Research Laboratory, AAMRL–TR–90–039, Aug., 1990.

Kontarinis et al., "Tactile Display of Vibratory Information in Teleoperation and Virtual Environments," PRESENCE, 4(4):387–402, 1995.

Lake, "Cyberman from Logitech," GameBytes, 1994.

Aukstakalnis et al., "Silicon Mirage: The Art and Science of Virtual Reality," ISBN 0–938151–82–7, pp. 129–180, 1992.

Eberhardt et al., "Including Dynamic Haptic Perception by The Hand: System Description and Some Results," DSC–vol. 55–1, Dynamic Systems and Control: vol. 1, ASME 1994.

Gobel et al., "Tectile Feedback Applied to Computer Mice," International Journal of Human–Computer Interaction, vol. 7, No. 1, pp. 1–24, 1995.

Pimentel et al., "Virtual Reality: through the new looking glass," $2^{nd}$ Editon; McGraw–Hill, ISBN 0–07–050167–X, pp. 41–202, 1994.

"Cyberman Technical Specification," Logitech Cyberman Swift Supplement, Apr. 5, 1994.

Ouhyoung et al., "The Development of A Low–Cost Force Feedback Joystick and Its Use in the Virtual Reality Environment," Proceedings of the Third Pacific Conference on Computer Graphics and Applications, Pacific Graphics '95, Seoul, Korea, Aug. 21–24, 1995.

Kaczmarek et al., "Tactile Displays," Virtual Environment Technologies.

* cited by examiner

ENHANCING INERTIAL TACTILE FEEDBACK IN COMPUTER INTERFACE DEVICES HAVING INCREASED MASS

CROSS REFERENCE TO RELATED APPLICATIONS

This application is a continuation-in-part of U.S. patent application Ser. Nos. 09/456,887, filed Dec. 7, 1999, entitled, "Tactile Mouse Device," now U.S. Pat. No. 6,211, 861, and 09/563,783, filed May 2, 2000, entitled, "Low Cost Force Feedback Device with Actuator for Non-Primary Axis," now U.S. Pat. No. 6,353,427, which is a continuation of application Ser. No. 09/103,281, now U.S. Pat. No. 6,088,019, filed Jun. 23, 1998, all of which are incorporated herein by reference in their entirety.

BACKGROUND OF THE INVENTION

The present invention relates generally to interface devices for allowing humans to interface with computer systems, and more particularly to low-cost computer interface devices that allow the user to provide input to computer systems and allow computer systems to provide haptic feedback to the user.

A user can interact with an environment displayed by a computer to perform functions and tasks on the computer, such as playing a game, experiencing a simulation or virtual reality environment, using a computer aided design system, operating a graphical user interface (GUI), navigate web pages, etc. Common human-computer interface devices used for such interaction include a mouse, joystick, trackball, gamepad, steering wheel, stylus, tablet, pressure-sensitive sphere, or the like, that is connected to the computer system controlling the displayed environment. Typically, the computer updates the environment in response to the user's manipulation of a physical manipulandum such as a joystick handle or mouse, and provides visual and audio feedback to the user. The computer senses the user's manipulation of the user object through device sensors that send locative signals to the computer. In other applications, interface devices such as remote controls allow a user to interface with the functions of an electronic device or appliance.

In some interface devices, force (kinesthetic) feedback and/or tactile feedback is also provided to the user, more generally known collectively herein as "haptic feedback." These types of interface devices can provide physical sensations which are felt by the user manipulating the interface device. One or more motors or other actuators are coupled to the housing or a manipulandum of the interface device, where the computer system directly or indirectly controls forces in conjunction and coordinated with displayed events and interactions by sending control signals or commands to the actuators. The computer system can thus convey physical force sensations to the user in conjunction with other supplied feedback as the user is grasping or contacting the interface device or manipulandum of the interface device.

One implementation for providing tactile feedback uses an inertial mechanism in the interface device to move an inertial mass, thereby providing inertial forces and sensations to the user contacting the interface device. Spinning mass actuator assemblies and linear-moving mass actuator assemblies, for example, can be used to provide inertial force sensations by creating forces with respect to the moving inertial mass. By moving the inertial mass with an actuator that is coupled to the housing of the computer peripheral, resultant forces are applied to the housing of the computer peripheral that are felt by the user. The intensity of the resultant force sensations is affected by relative size of the inertial mass as compared to the size/mass of the entire interface device. Thus, if the inertial mass is large and the rest of the interface device is very light, the resultant forces felt by the user are strong. Likewise, if the inertial mass is very small compared to the mass of the rest of the interface device, the resultant forces felt by the user will not be as strong. To reduce the production cost of the interface device, there is incentive to save power expended by the actuator and the size of the interface device; thus, there is an incentive to make the inertial mass as small as possible. However, it can be difficult to make the mass of the rest of the interface device small enough so that the forces resulting from a small mass are strong enough for compelling tactile feedback, due to other components required by the interface device that restrict how light the device can be made.

One component that may prevent an interface device from having a very low mass is a battery or other power storage element that supplies power to the device for its operation. Wireless interface devices, in particular, depend on one or more batteries to power the components of the interface device and to enable communication between the interface device and host computer or host processor. Power elements such as rechargeable batteries tend to be heavy compared to other standard device components, and add significant weight to the system. This added mass reduces the effectiveness of the inertial feedback actuator, as explained above, and creates a barrier to employing low-cost inertial haptic feedback in wireless computer peripherals, wireless handheld computers, and other interface devices having batteries or otherwise having an increased mass.

SUMMARY OF THE INVENTION

The present invention is directed to methods and apparatus for enhancing inertial tactile feedback in computer interface devices having an increased mass, such as wireless devices having the increased mass due to batteries or other power storage elements.

More specifically, the present invention relates to a haptic feedback control device in communication with a host computer implementing a host application program. The device. such as a gamepad or mouse, includes a housing that is physically contacted by the user, a sensor device that detects movement of a manipulandum or the housing and outputs sensor signals, an actuator that outputs an inertial force transmitted through said housing to said user, where the inertial force is generated by moving an inertial mass, and a power storage element is coupled to the housing and provides power to the actuator. The power storage element is inertially decoupled from the housing to reduce the mass of the haptic feedback device with respect to the inertial mass, thereby allowing stronger haptic sensations to be experienced by the user for a given size of the inertial mass.

In one embodiment, the power storage element is at least one battery that is coupled to the housing by a compliant layer or member. The compliant layer or member can be a layer of foam coupled between the battery and housing, a spring member, or other type of member. An attachment member can be coupled between layer and battery, where the battery may be detached from the attachment member by the user. In some embodiments, the sensor signals are provided to the host computer via wireless transmission, where the haptic feedback device receives information from the host via wireless reception. The wireless transmission and reception is implemented via radio signals. The inertial mass can be oscillated linearly or rotated.

In another embodiment, a haptic feedback device in communication with a host computer implementing a host application program. The device includes a housing contacted by the user, a sensor device detecting movement of a manipulandum or housing and outputting sensor signals, an actuator outputting an inertial force to the user contacting the housing by moving an inertial mass, and a component coupled to the housing by a compliant layer or member. The component is inertially decoupled from the housing to reduce the mass of the haptic feedback device with respect to the inertial mass, thereby allowing stronger haptic sensations to be experienced by the user. The component can be a power storage element or other type of component in the interface device. A method of the present invention for providing haptic feedback to a user of an interface device includes similar features.

The present invention advantageously provides a haptic feedback device having increased mass that provides inertial tactile sensations of minimally reduced strength to a user. Heavy components such as batteries are inertially decoupled from the interface device so that the mass of the heavy components does not significantly dampen the haptic sensations. This is especially advantageous to devices such as wireless interface devices, which require typically heavy batteries to provide power for their various functions.

These and other advantages of the present invention will become apparent to those skilled in the art upon a reading of the following specification of the invention and a study of the several figures of the drawing.

DETAILED DESCRIPTION OF PREFERRED EMBODIMENTS

Figure 1:
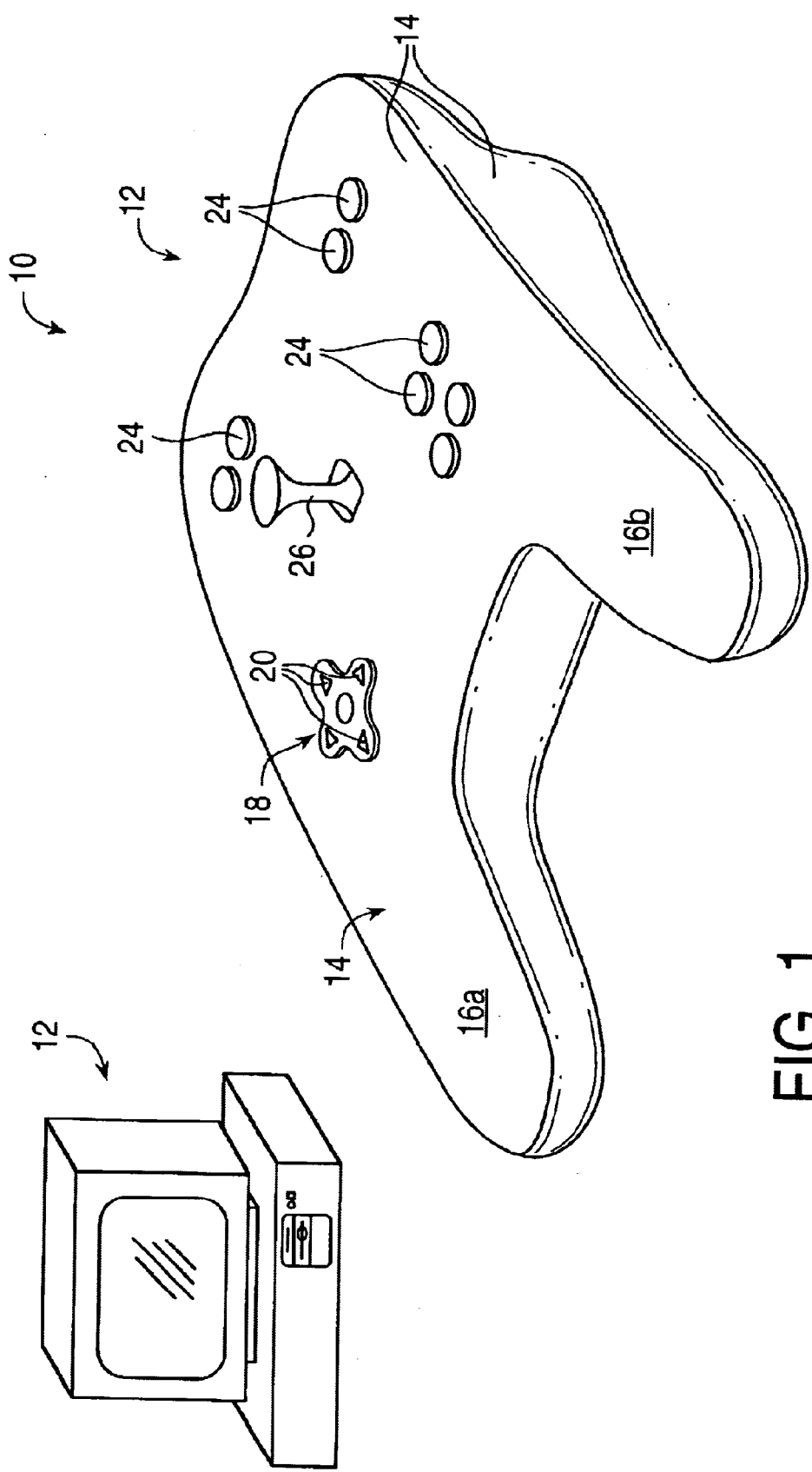
FIG. 1 is a perspective view of a gamepad control suitable for use with the present invention.

FIG. 1 is a perspective view of one example of a haptic feedback system including an interface device 10 and host computer 12 for use with the present invention. The device 10 can be used for interfacing a user with a computer generated environment implemented by the host computer 12.

Interface device 10 of the described embodiment is in the form of a handheld controller, of similar shape and size to many "gamepads" currently available for video game console systems or personal computer systems. A housing 14 of the interface device 10 is shaped to easily accommodate two hands gripping the device at the gripping projections 16a and 16b. In the described embodiment, the user accesses the various controls on the device 10 with his or her fingers. In alternate embodiments, the interface device can take a wide variety of forms, including devices that rest on a tabletop or other surface, stand-up arcade game machines, laptop devices or other devices worn on the person, handheld or used with a single hand of the user, etc., as described below.

The controls on the gamepad device 10 can include a direction pad ("d-pad" or "joypad") 18 can be included on device 10 to allow the user to provide directional input to the host computer 12. In its most common implementation, the user can press down on one of the extensions 20 of the d-pad to provide a directional input signal to the host computer for the corresponding direction. In some embodiments, haptic feedback such as tactile sensations can be output directly on the direction pad 18, as described in application Ser. No. 09/467,309, filed Dec. 17, 1999, now U.S. Pat. No. 6,563,487, and incorporated herein by reference in its entirety.

One or more buttons 24 can also be provided on the surface of the housing 14 of the device 10. The user's hands have easy access to the buttons, each of which may be pressed by the user to provide a distinct input signal to the host computer 12. In some embodiments, one or more of the buttons 24 can be provided with tactile feedback similarly to the direction pad 18. One or more finger joysticks 26 can be included in device 10 that project out of the top surface of the housing 14 to be manipulated by the user in one or more degrees of freedom. For example, the user can grasp each of grips 16a and 16b of the device and use a thumb or finger to manipulate the joystick 26 in two (or more, if desired) degrees of freedom. This motion is translated into input signals provided to the host computer 12, and can be different signals than those provided by the direction pad 18. In other embodiments, a sphere can be provided instead of or in addition to the joystick 26, where one or more portions of the sphere can extend out of left, right, top and/or bottom sides of the housing 14, e.g., allowing at least two fingers of the user to grip the sphere. The sphere may be rotated in place within two rotary degrees of freedom and operate similarly to a joystick, as described in detail in copending application Ser. No. 09/565,207, filed May 4, 2000, and incorporated herein by reference in its entirety.

Other controls may also be placed within easy reach of the hands grasping the housing 14. For example, one or more trigger buttons can be positioned on the underside of the housing and can be pressed by the fingers of the user. Other controls can also be provided on various locations of the device 10, such as a dial or slider for throttle control in a game, a four- or eight-way hat switch, knobs, trackballs, a roller or sphere, etc. Any of these controls can also be provided with haptic feedback, such as tactile feedback. For example, embodiments of buttons, direction pads, and knobs having force feedback are described in patent application Ser. No. 09/156,802, filed Sep. 17, 1998, now U.S. Pat. No. 6,184,868, and U.S. Pat. No. 6,154,201, all incorporated herein by reference in their entirety. The forces can be co-located such that the user feels the forces in the degree of freedom of movement of the button or direction pad; or, the button, direction pad, or other control can be provided with tactile sensations such as vibrations.

Herein, any of the abovementioned controls and equivalents are referred to as a "manipulandum" or "manipulatable object." Such a term can include a button, a joystick, a direction pad, etc.

In the preferred embodiment, the housing 14 of the device 10 is provided with inertial sensations that are generated by an actuator assembly within the housing 14 of the device.

The user experiences the inertial tactile sensations by gripping the extensions 16a and 16b or by otherwise contacting the housing 14. The actuators providing these sensations is described in greater detail below with respect to FIG. 2.

In other embodiments, a moveable portion of the housing which is contacted by the user when the user operates the device can provide tactile feedback as described in copending patent application Ser. No. 09/156,802. In such an embodiment, the moveable portion is moved parallel to the side of the housing so that the moveable portion moves in shear with the user's finger. This allows two different tactile sensations to be output simultaneously to the user; for example, a vibration of one frequency can be conveyed through the housing to the user and a different-frequency vibration can be conveyed to the user via the moveable portion.

Preferably, the interface device 10 communicates with the host computer 12 using a wireless communication system. For example, the device 10 can include a transmitter, such as radio frequency transmitter, that transmits sensor signals, or representations thereof, from the various controls on the device into the air. The host computer system 12 can include a receiver that picks up the transmitted signals so that the host computer can update a graphical environment or other running program based on the sensor signals. Furthermore, the device 10 can include a receiver for receiving host commands and signals from the host computer 12, e.g. commands to cause haptic feedback, while the host 12 includes a transmitter for sending such wireless signals. Other types of wireless communication may also be used, such as infrared, optical, etc.

In alternate embodiments, interface device 10 is coupled to host computer 12 by a bus 32, which can be any of several types of communication media. For example, a serial interface bus, parallel interface bus, or wireless communication link can be used (radio, infrared, etc.). Specific implementations can include Universal Serial Bus (USB), IEEE 1394 (Firewire), RS-232, or other standards.

The interface device 10 includes circuitry necessary to report control signals to the host computer 12 and to process command signals from the host computer 12. For example, sensors can be used to report the direction pressed by the user for the direction pad 18. The device also preferably includes circuitry that receives command signals from the host and outputs tactile sensations in accordance with the command signals using one or more device actuators. In some embodiments, a separate, local microprocessor can be provided on the device to both report sensor data to the host and to carry out commands received from the host, such commands including, for example, the type of tactile sensation and parameters describing the commanded tactile sensation. The microprocessor can implement tactile sensations independently after receiving a host command by controlling the device actuators; or, the host can maintain a greater degree of control over the tactile sensations by controlling actuators more directly. In other embodiments, logic circuitry such as state machines provided on the device 10 can handle tactile sensations as directed by the host computer 12. Architectures and control methods that can be used for reading sensor signals and providing haptic feedback in the device 10 are described in greater detail in U.S. Pat. No. 5,734,373 and copending application Ser. Nos. 60/133,208, 09/376,649, and 09/687,744, now U.S. Pat. No. 6,411,276, all incorporated herein by reference.

Host computer 12 is preferably a video game console, personal computer, workstation, or other computing or electronic device. One of a variety of home video game systems, such as systems available from Nintendo, Sega, or Sony, a television "set top box" or a "network computer", etc. can be used. Alternatively, personal computers, such as an IBM-compatible or Macintosh personal computer, or a workstation, such as a SUN or Silicon Graphics workstation, can be used. Or, the host 12 and device 10 can be included in a single housing in an arcade game machine, portable or handheld computer, vehicular computer, or other device. Host computer system 12 preferably implements a host application program with which a user is interacting via peripherals and interface device 10. For example, the host application program can be a video or computer game, medical simulation, scientific analysis program, operating system, graphical user interface, or other application program.

The host application preferably displays graphical images of the environment on a display device included with the host computer, such as a display screen 34 (such as a television, flat panel display, CRT, etc.), 3D display goggles, projection device, etc. The software and environment running on the host computer 12 may be of a wide variety. For example, the host application program can be a video game, utility program, simulation, graphical user interface (GUI), Web page or browser that implements HTML or VRML instructions, scientific analysis program, virtual reality training program or application, word processor, or other application program that utilizes input from the interface device 10 and (in force feedback embodiments) outputs force feedback commands to the controller 10. For example, many game application programs include haptic feedback functionality and may communicate with the interface device 10 using a standard protocol/drivers such as I-Force®, FEELit®, or Touchsense™ available from Immersion Corporation of San Jose, Calif. Herein, computer 12 may be referred as displaying "graphical objects" or "entities." These objects are not physical objects, but are logical software unit collections of data and/or procedures that may be displayed as images by computer 12 on display screen 34, as is well known to those skilled in the art. A displayed cursor or a simulated cockpit of an aircraft might be considered a graphical object.

In operation, the controls of interface device 10 are manipulated by the user, which indicates to the computer how to update the implemented application program(s). An electronic interface included in housing 14 of device 10 can couple the device 10 to the computer 12. The host computer 12 receives the input from the interface device and updates an application program in response to the input. For example, a game presents a graphical environment in which the user controls one or more graphical objects or entities using the direction pad 18 and/or other controls such as joystick 26 and buttons 24. The host computer can provide haptic feedback commands and/or data to the device 10 to cause haptic feedback to be output by the device 10.

Many other types of interface devices can also be used with the present invention. For example, a handheld remote control device can be used, which the user grasps in one hand and manipulates controls to access the functions of an electronic device or appliance remotely by a user (such as a television, video cassette recorder or DVD player, audio/video receiver, Internet or network computer connected to a television, etc.). Other handheld devices or portable devices may also benefit from the present invention, such as cell phones, portable computers or keyboards, personal digital assistants, touchpads or screens, game controllers, etc. A computer mouse can be used, where inertial haptic sensations are provided on the mouse housing and the motion of the mouse housing in a workspace plane is tracked. A joystick handle can be provided with inertial haptic sensations, where the haptic sensations are output on the joystick handle as the sole haptic feedback or to supplement kinesthetic force feedback in the degrees of freedom of the joystick. Trackballs, steering wheels, styluses, rotary knobs, linear sliders, gun-shaped targeting devices, medical devices, grips, etc. can also make use of the present invention when providing haptic sensations.

Figure 2:
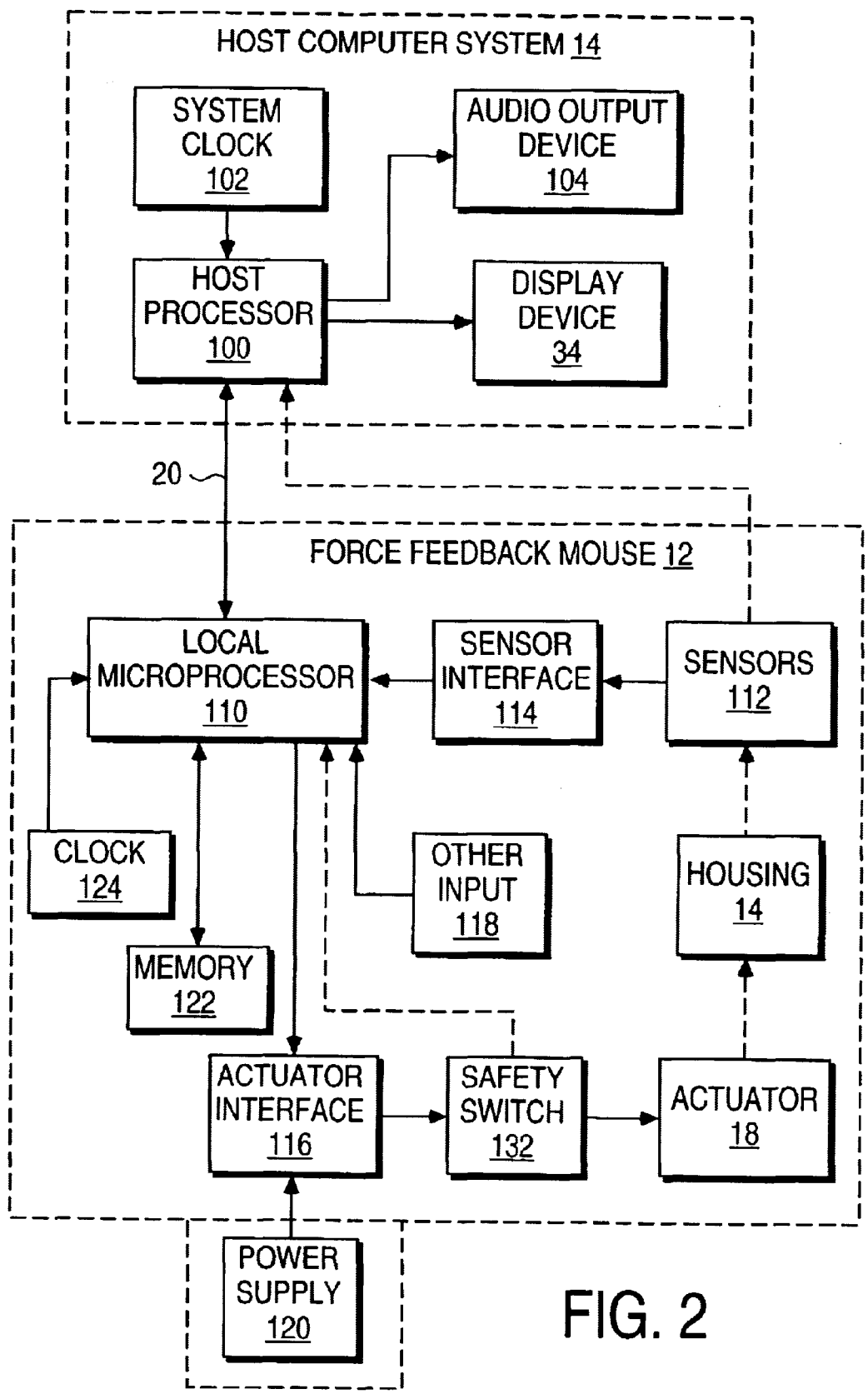
FIG. 2 is a block diagram of a haptic feedback system suitable for use with the present invention.

FIG. 2 is a block diagram illustrating one embodiment of a haptic feedback system suitable for use with any of the described embodiments of the present invention and including a local microprocessor and a host computer system.

Host computer system 12 preferably includes a host microprocessor 100, a clock 102, a display screen 34, and an audio output device 104. The host computer also includes other well known components, such as random access memory (RAM), read-only memory (ROM), and input/output (I/O) electronics (not shown). Display screen 34 displays images of a game environment, operating system application, simulation, etc. Audio output device 104, such as speakers, is preferably coupled to host microprocessor 100 via amplifiers, filters, and other circuitry well known to those skilled in the art and provides sound output to user when an "audio event" occurs during the implementation of the host application program. Other types of peripherals can also be coupled to host processor 100, such as storage devices (hard disk drive, CD ROM drive, floppy disk drive, etc.), printers, and other input and output devices. Device 10 is coupled to host computer system 12 by a bidirectional communication channel 20, which in the preferred embodiment is wireless as described above.

Device 10 can include a local microprocessor 110. Local microprocessor 110 can optionally be included within the housing of device 10 to allow efficient communication with other components of the mouse. Processor 110 is considered local to device 10, where "local" herein refers to processor 110 being a separate microprocessor from any processors in host computer system 12. "Local" also preferably refers to processor 110 being dedicated to haptic feedback and sensor I/O of device 10. Microprocessor 110 can be provided with software instructions (e.g., firmware) to wait for commands or requests from computer host 12, decode the command or request, and handle/control input and output signals according to the command or request. In addition, processor 110 can operate independently of host computer 12 by reading sensor signals and calculating appropriate forces from those sensor signals, time signals, and stored or relayed instructions selected in accordance with a host command. Suitable microprocessors for use as local microprocessor 110 include the MC68HC711E9 by Motorola, the PIC16C74 by Microchip, and the 82930AX by Intel Corp., for example, as well as more sophisticated force feedback processors such as the Immersion Touchsense Processor. Microprocessor 110 can include one microprocessor chip, multiple processors and/or coprocessor chips, and/or digital signal processor (DSP) capability.

Microprocessor 110 can receive signals from sensor 112 and provide signals to actuator assembly 18 in accordance with instructions provided by host computer 12 over communication interface 20. For example, in a local control embodiment, host computer 12 provides high level supervisory commands to microprocessor 110 over bus 20, and microprocessor 110 decodes the commands and manages low level force control loops to sensors and the actuator in accordance with the high level commands and independently of the host computer 12. This operation is described in greater detail in U.S. Pat. Nos. 5,739,811 and 5,734,373, both incorporated by reference herein. In the host control loop, force commands are output from the host computer to microprocessor 110 and instruct the microprocessor to output a force or force sensation having specified characteristics. The local microprocessor 110 reports data to the host computer, such as locative data that describes the position of a joystick or the device in one or more provided degrees of freedom. The data can also describe the states of buttons, direction pad, and safety switch 132. The host computer uses the locative data to update executed programs. In the local control loop, actuator signals are provided from the microprocessor 110 to actuator assembly 18 and sensor signals are provided from the sensor 112 and other input devices 118 to the microprocessor 110. Herein, the term "tactile sensation" refers to either a single force or a sequence of forces output by the actuator assembly 18 which provide a sensation to the user. For example, vibrations, a single jolt, or a texture sensation are all considered tactile sensations. The microprocessor 110 can process inputted sensor signals to determine appropriate output actuator signals by following stored instructions. The microprocessor may use sensor signals in the local determination of forces to be output on the user object, as well as reporting locative data derived from the sensor signals to the host computer.

In yet other embodiments, other hardware can be provided locally to device 10 to provide functionality similar to microprocessor 110. For example, a hardware state machine incorporating fixed logic can be used to provide signals to the actuator assembly 18 and receive sensor signals from sensors 112, and to output tactile signals according to a predefined sequence, algorithm, or process. Techniques for implementing logic with desired functions in hardware are well known to those skilled in the art. Such hardware can be better suited to less complex force feedback devices, such as the device of the present invention.

In a different, host-controlled embodiment, host computer 12 can provide low-level force commands over bus 20, which are directly transmitted to the actuator assembly 18 via microprocessor 110 or other circuitry. Host computer 12 thus directly controls and processes all signals to and from the device 10, e.g. the host computer directly controls the forces output by actuator assembly 18 and directly receives sensor signals from sensor 112 and input devices 118. This embodiment may be desirable to reduce the cost of the force feedback device yet further, since no complex local microprocessor 110 or other processing circuitry need be included in the device. Other embodiments may employ a "hybrid" organization where some types of force effects (e.g. closed loop effects and/or high frequency effects) are controlled purely by the local microprocessor, while other types of effects (e.g., open loop and/or low frequency effects) may be controlled by the host.

In the simplest host control embodiment, the signal from the host to the device can be a single bit that indicates whether to pulse the actuator at a predefined frequency and magnitude. In a more complex embodiment, the signal from the host could include a magnitude, giving the strength of the desired pulse. In yet a more complex embodiment, the signal can include a direction, giving both a magnitude and a sense for the pulse. In still a more complex embodiment, a local processor can be used to receive a simple command from the host that indicates a desired force value to apply over time. The microprocessor then outputs the force value for the specified time period based on the one command, thereby reducing the communication load that must pass between host and device. In an even more complex embodiment, a high-level command with tactile sensation parameters can be passed to the local processor on the device which can then apply the full sensation independent of host intervention. Such an embodiment allows for the greatest reduction of communication load. Finally, a combination of numerous methods described above can be used for a single mouse device 10.

Local memory 122, such as RAM and/or ROM, is preferably coupled to microprocessor 110 in device 10 to store instructions for microprocessor 110 and store temporary and other data. For example, force profiles can be stored in memory 122, such as a sequence of stored force values that can be output by the microprocessor, or a look-up table of force values to be output based on the current position of the user object. In addition, a local clock 124 can be coupled to the microprocessor 110 to provide timing data, similar to system clock 18 of host computer 12; the timing data might be required, for example, to compute forces output by actuator assembly 18 (e.g., forces dependent on calculated velocities or other time dependent factors). In embodiments using an appropriate communication interface, timing data for microprocessor 110 can be alternatively retrieved from the communication interface.

Sensors 112 sense the position or motion of the device 10 and/or a component thereof (e.g. a joystick 26, direction pad 18, or the housing in a mouse embodiment) in degree(s) of freedom and provides signals to microprocessor 110 (or host 12) including information representative of the position or motion. Sensors suitable for detecting motion include digital optical encoders, as is well known to those skilled in the art. Optical sensor systems, linear optical encoders, potentiometers, optical sensors, velocity sensors, acceleration sensors, strain gauge, or other types of sensors can also be used, and either relative or absolute sensors can be provided. Optional sensor interface 114 can be used to convert sensor signals to signals that can be interpreted by the microprocessor 110 and/or host computer system 12, as is well known to those skilled in the art.

Actuator assembly 18 transmits forces to the housing 14, buttons, and/or other portions of the device 10 in response to signals received from microprocessor 110 and/or host computer 12, and is described in greater detail below. Many types of actuators can be used, including a rotary DC motors, voice coil actuators, moving magnet actuators, pneumatic/ hydraulic actuators, solenoids, speaker voice coils, piezo-electric actuators, etc. The assembly may also include mechanisms or structure to assist the transmission of forces, such as a flexure. In many of the implementations herein, the actuator assembly has the ability to apply short duration force sensation on the housing or handle of the mouse. This short duration force sensation is described herein as a "pulse." The "pulse" can be directed substantially along an axis in the preferred embodiment. In progressively more advanced embodiments, the magnitude of the "pulse" can be controlled; the sense of the "pulse" can be controlled, either positive or negative biased; a "periodic force sensation" can be applied to the housing, where the periodic sensation can have a magnitude and a frequency, e.g. a sine wave; the periodic sensation can be selectable among a sine wave, square wave, saw-toothed-up wave, saw-toothed-down, and triangle wave; an envelope can be applied to the period signal, allowing for variation in magnitude over time; and the resulting force signal can be "impulse wave shaped" as described in U.S. Pat. No. 5,959,613. There are two ways the period sensations can be communicated from the host to the device. The wave forms can be "streamed" as described in U.S. Pat. No. 5,959,613 and provisional patent application Ser. No. 60/160,401, both incorporated herein by reference in their entirety. Or the waveforms can be conveyed through high level commands received from the host that include parameters such as magnitude, frequency, and duration, as described in U.S. Pat. No. 5,734,373.

Actuator interface 116 can be optionally connected between actuator assembly 18 and microprocessor 110 to convert signals from microprocessor 110 into signals appropriate to drive actuator assembly 18. Interface 38 can include power amplifiers, switches, digital to analog controllers (DACs), analog to digital controllers (ADCs), and other components, as is well known to those skilled in the art.

Other input devices 118 are included in device 10 and send input signals to microprocessor 110 or to host 12 when manipulated by the user. Such input devices include buttons 16 and can include additional buttons, dials, switches, scroll wheels, or other controls or mechanisms.

Power supply 120 can be included in device 10 coupled to actuator interface 116 and/or actuator assembly 18 to provide electrical power to the actuator; one preferred embodiment of such a power supply are batteries, described in greater detail below. Alternatively, power can be drawn from a power supply separate from device 10, or power can be received across a USB or other bus. Also, received power can be stored and regulated by device 10 and thus used when needed to drive actuator assembly 18 or used in a supplementary fashion, as described in copending application Ser. No. 09/456,887, filed Dec. 7, 1999, and incorporated herein by reference in its entirety. A safety switch 132 can optionally be included to allow a user to deactivate actuator assembly 18 for safety reasons.

Figure 3A:
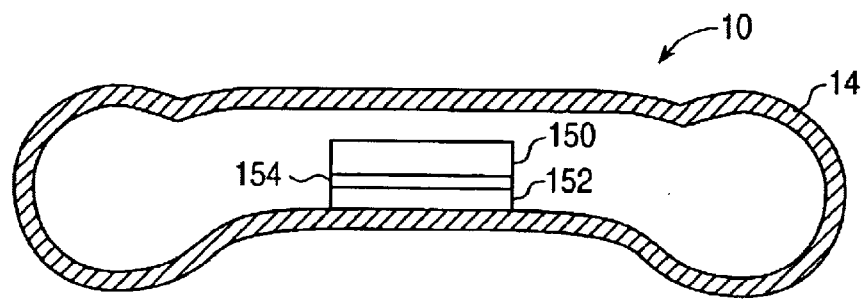
FIGS. 3a and 3b are side elevation and top sectional views, respectively, of a gamepad device of the present invention.
Figure 3B:
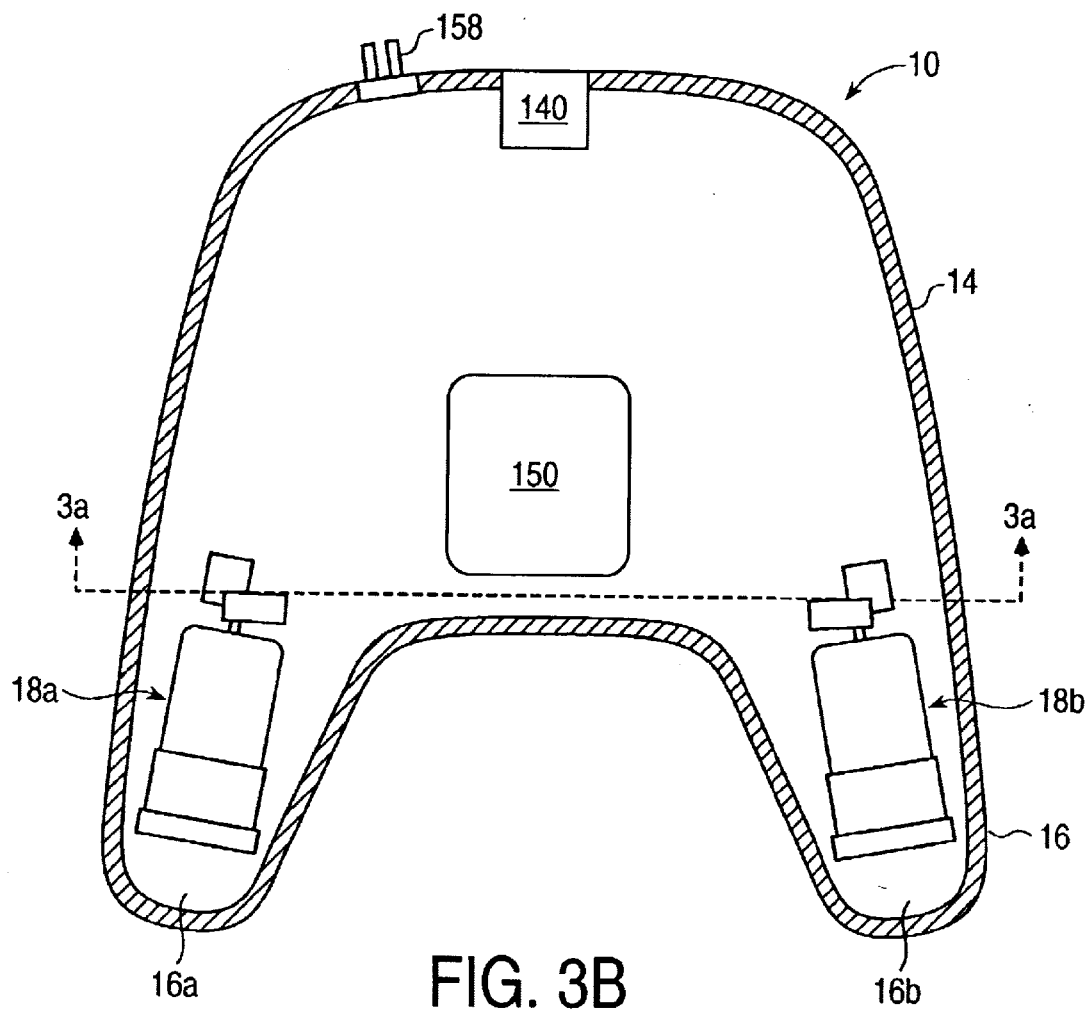

FIG. 3a is a side sectional view and FIG. 3b is a top plan sectional view of the bottom portion of the gamepad device 10 shown in FIG. 1. FIG. 3b shows a cross section line 3a—3a for the view of FIG. 3a. For clarity, not all of the components in the device 10 are shown in FIGS. 3a–3b. A transmitter/receiver 140 is shown, which can send and receive communication signals to and from the host 14.

In each gripping projection 16a and 16b of the housing 14, an actuator assembly 18a and 18b can be coupled to the housing. In a preferred embodiment, each actuator assembly 16a and 16b includes an actuator and a flexure for oscillating an inertial mass linearly and generating haptic sensations on the housing 14. One example of an actuator assembly suitable for use with the present invention is described below with respect to FIG. 4. In other embodiments, other types of actuator assemblies can be used. For example, an eccentric mass can be coupled to a rotary actuator and rotated or spun to provide inertial sensations on the housing. Other inertial masses can be rotated or linearly moved in a variety of other embodiments.

The two actuator assemblies 18a and 18b can preferably be operated in conjunction to provide a greater range and fidelity of haptic sensations. For example, due to the separation of the actuator assemblies in the grip extensions 16a and 16b, a "balance" parameter of the sensations can be controlled, so that a haptic sensation feels to the user as if it is positioned closer to the left or to the right of the device, as commanded by the host or local microprocessor. A haptic sensation can also be actively "swept" or moved from left to right, or vice versa, across the housing of the gamepad device. Such embodiments are described in greater detail in copending patent application Ser. No. 60/236,417, filed Sep. 28, 2000 and incorporated herein by reference in its entirety.

A power storage element, such as a battery 150, is positioned within the housing 14 to supply power for the interface device 10. As described above, one preferred embodiment for the device is a wireless communication device that allows information to be sent between the host computer and the device 10 without physical wires or cables. Such an embodiment may use a battery 150 to supply power to the actuator assemblies 18a and 18b as well as the other components of the device requiring power, such as a local microprocessor, sensors, lights on the device, etc. Battery 150 can be the disposable form of battery, which the user must replace with a new battery when it expends all of its power; or battery 150 can be a rechargeable form of battery which the user can remove, recharge, and replace. Some embodiments can provide a convenient compartment door in the housing 14 to allow easy access to the battery 150 by the user. One or more batteries 150 can be provided in the device 10 for the desired amount of power. Other types of power storage elements that supply power may be used in other embodiments.

Battery 150 can be a heavy component and thus may disadvantageous in an inertial haptic feedback device. The heaviness of the battery 150 can add to the overall mass of the device, which may weaken the strength of the inertial haptic sensations felt by the user. This is because inertial sensations are conveyed by moving an inertial mass with respect to an inertial ground (such as the inertial mass itself) rather than with respect to an earth ground. Thus, the sensations are felt by the user when the housing 14 moves in space in reaction to the motion of the inertial mass. The less restricted the motion of the housing, the greater the strength of the inertial sensations. The greater the mass of the housing, with a given size of inertial mass, the less strength the inertial sensations will have. This can be compensated for to some extent by increasing the size of the inertial mass until the desired strength of inertial sensations are output. However, inertial masses of greater size require stronger actuators to drive them, which increases the cost and size of the entire device and may not be suitable for portable, wireless devices.

In the present invention, the effect of the battery 150 on the mass of the device is mitigated by providing a flexible or compliant coupling between the battery 150 and the housing 14. For example, a layer 152 of compliant foam can be placed between battery 150 and housing 14. Layer 152 allows the battery 150 to move at least partially independently of the housing 14, and thus inertially decouples the battery 150 from the housing 14. The layer 152 reduces the inertial contribution of the battery 150 to the system and allows the user to feel stronger tactile sensations with the given actuator assemblies 18a and 18b than if the battery 150 were rigidly coupled to the housing without layer 152. Thus, more compelling and efficient tactile sensations can be output using the device 10 of the present invention by providing a greater perceived magnitude of haptic sensations for a given actuator size and strength. This is particularly effective for harmonically-generated vibration sensations.

Since many embodiments may allow a user to replace or change the battery 150 when it runs low of power, the battery 150 is preferably easily removable from the device 10. In one embodiment, an attachment member 154 can be coupled to the compliant layer 152. The battery 150 can be removably attached to the attachment member by the user. For example, the attachment member can include braces, pegs, or other features which can securely hold the battery 150 to the layer 152, yet allow the user to remove the battery 150 with relative ease when desired.

In other embodiments, the battery 150 may be recharged without the user having to remove it from the device housing. For example, the housing 14 can include a "docking port" or electrical connector 158 connected to a rechargeable battery 150 which allows the device 10 to be plugged into a mating connector (not shown) on a recharging power source device that is, for example, connected to a standard AC power outlet. Thus, when the battery 150 runs low on power, the user can simply plug the device 10 into the connector on the recharging station, which recharges the battery 150. In such an embodiment, the battery 150 can be directly connected to the compliant layer 152; or, the attachment member 154 can still be included to allow removal of the battery when the rechargeable battery can no longer hold a charge.

In alternate embodiments, other types of compliant or flexible couplings can be used instead of a foam layer 152. Other elastic or compliant layers can be used, for example, such as a rubber layer or member. In some embodiments, a spring element can be coupled between battery 150 and housing 14, such as a leaf spring.

In addition, other heavy components included in the housing 14 may increase the mass of the device 10, thus reducing the strength of the tactile sensations output by actuator assemblies 18a and 18b. Such components may also be provided with a compliant coupling to the housing 14. For example, a heavy sensor or switch, transceiver, digital controller, electronic component, etc. can be coupled to the housing by a compliant or flexible member.

Figure 4:
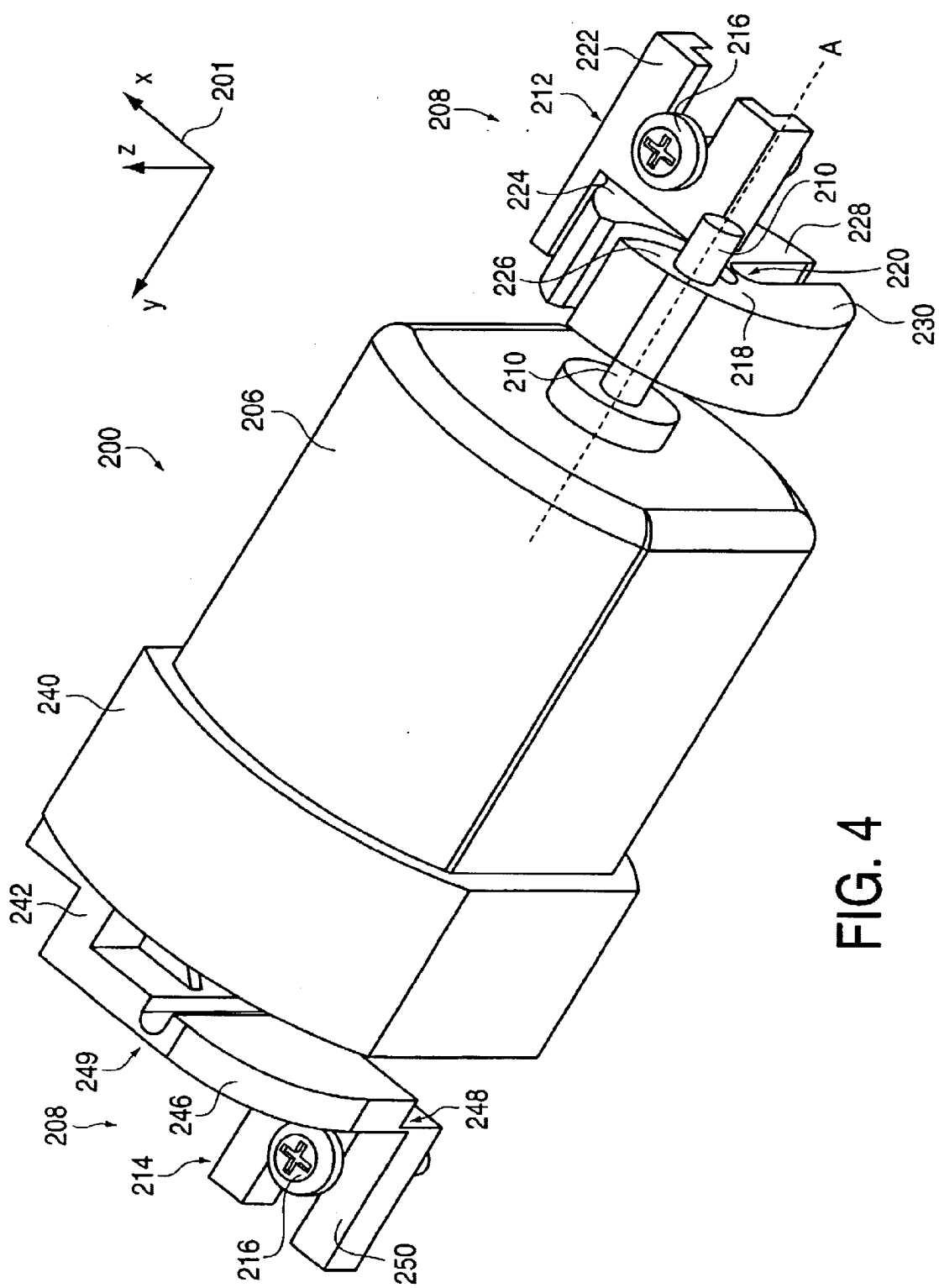
FIG. 4 is a perspective view of an example of an actuator assembly suitable for use with the present invention.

FIG. 4 is a perspective view of one embodiment of an actuator assembly 200 suitable for use as assembly 18a or 18b shown in FIGS. 3a–3b. This embodiment is described in greater detail in copending application Ser. No. 60/236,558, filed Sep. 28, 2000, which is incorporated herein by reference.

The assembly 200 can be coupled to the inside of the housing of an interface device 10, such as the inner housing surface of a grip or extended portion 16 of a gamepad device as shown in FIGS. 3a–3b, or to some other feature of a device such as the bottom portion of a mouse housing. Since the assembly 200 has a size substantially determined by the size of the actuator used, an actuator can be chosen which has the dimensions to fit into a desired space. Space should also be allowed for the movement of the actuator.

The assembly 200 is operative to output linear oscillating inertial forces substantially along the x-axis 201 shown in FIG. 4. The assembly 200 can be placed at any angle or orientation in a device; since the assembly 200 outputs forces substantially linearly along a single axis, the assembly can be positioned so that the forces are directed along a desired axis. For example, in a gamepad device, the x-axis 201 can be oriented in a direction in which the forces are more effectively output; often, this is the direction perpendicular to the horizontal plane of the gamepad in which the device is generally held. For a mouse device, the forces are advantageously output along a vertical axis perpendicular to the plane of mouse movement.

Actuator assembly 200 includes an actuator 206 and a flexure mechanism ("flexure") 208. In the preferred embodiment, the actuator 206 acts as an inertial mass, so that a separate inertial mass is not required. Actuator 206 can be a rotary DC motor, as shown, which is narrowly constructed to fit into a narrow space. The actuator 206 can be energized to rotate a shaft 210.

Flexure mechanism 208 includes two separated portions 212 and 214, where each portion is placed on an opposite side of the actuator 206. Each portion 212 and 214 is preferably a single, unitary piece made of a material such as polypropylene plastic ("living hinge" material) or other flexible material. The portions 212 and 214 are each grounded to the interface device housing (or other grounded member) by screws 216.

Flexure portion 212 includes a rotating member 218, a flexure joint 220, and a grounded member 222. Rotating member 218 is rigidly coupled to the rotating shaft 210 of the actuator 206. Flexure joint 220 couples the rotating member 218 to the grounded member 222. Furthermore, the portion 212 preferably includes a clockwise stop 224 coupled to the ground member 222, a stop 226 coupled to the rotating member 218 that engages the stop 224, a counter-clockwise stop 228 coupled to the grounded member 222, and a stop 230 coupled to the rotating member 218 that engages the stop 228. The grounded member 222 is rigidly attached to a ground surface (e.g. the device housing) by a screw 216 or other equivalent fastener.

Flexure portion 214 includes a collar 240, a linking member 242, an intermediate member 246, and a ground member 250. The collar 240 is fitted on the end of the actuator 206 to firmly grip the actuator housing. The linking member 242 is rigidly coupled to the collar 240, and the intermediate member 246 is coupled to the linking member 242 by a flex joint 244. The intermediate member is coupled at its other end to the ground member 250 by another flex joint 248. The ground member 250 is rigidly attached to the ground surface by a screw 216 or other equivalent fastener.

The actuator assembly 200 operates as follows. The actuator 206 rotates the shaft 210 harmonically (in two directions) according to a control signal, such as a sine wave, square wave, etc. When the shaft 210 is rotated clockwise about an axis A (viewing the shaft from the portion 212 side) by the actuator, the rotating member 218 also rotates in that direction. The flex joint 220 is made thin in the z-dimension to allow this rotation. Furthermore, the flex joint 220 allows the actuator 206, shaft 210 and rotating member 220 to linearly move in the direction approximately toward the stop 224. To channel the motion of the flexure into the desired x-axis motion, the flexure portion 214 at the other end of the actuator includes flex joint 248, which is made thin along the y-axis to allow a pivoting motion of the actuator along the x-axis. In addition, since the motion of the actuator 206 is partially along the z-axis as well, the flex joint 248 is provided having a thin section along the z-axis to allow this z-axis motion. In other embodiments, the flex joint 248 can be omitted if there is enough z-axis flex in the system to allow the small amount of z-axis motion of the actuator. At some point, the stop 226 on the rotating member engages the stop 224 so that no further clockwise rotation is allows. Other embodiments can omit the stops 224, 226, 228, and 230, and allow the physical limitations of the flex joints in the system determine the limits to motion.

When the shaft 210 is rotated counterclockwise about axis A by the actuator, the rotating member is also rotated counterclockwise. The flex joint 220 allows the rotating member 218 to rotate away from the stop 224, and also allows the rotating member 218, shaft 210 and actuator 206 to translate away from the stop 224. The flex joint 244 of the flexure portion 214 allows the actuator 206 to move along the x-axis in this fashion. The flex joint 248 allows the small amount of z-axis motion of the actuator and thus allows the actuator x-axis motion to more easily occur. At some point, the stop 230 on the rotating member engages the grounded stop 228 so that no further counterclockwise rotation is allowed.

In the preferred operation, the actuator 206 is operated in only a fraction of its rotational range when driving the rotating member 218 in two directions, allowing high bandwidth operation and high frequencies of pulses or vibrations to be output. The actuator can be driven by a harmonic forcing function, such as a sine wave, triangle wave, or square wave. As indicated above, in actuality, the actuator 206 moves only approximately linearly, since there is a small arc to the travel. However, this arc is small enough to be ignored for most practical purposes. By quickly changing or oscillating the rotation direction of the actuator shaft 210, the actuator can be made to oscillate along the x-axis and create a vibration on the housing with the actuator 206 acting as an inertial mass. Preferably, enough space is provided around the actuator along the x-axis to allow its range of motion without impacting any surfaces or portions of the device housing.

A variety of tactile sensations can be output to the user with the present invention, many of which are described in greater detail in copending application Ser. No. 09/585,741, filed Jun. 2, 2000, entitled, "Haptic Interface Device and Actuator Assembly Providing Linear Haptic Sensations," which is incorporated herein by reference in its entirety.

In addition, the flex joints included in flexure portions 212 and 214, such as flex joints 220 and 244, act as spring members to provide a restoring force toward the origin position (rest position) of the actuator 206. The travel stops 224 and 228 include the advantage of providing a qualitative improvement to the feel of forces experienced by the user and can assist the motion of the actuator in the opposite direction after it has reached a limit.

In the preferred embodiment, the actuator 206 itself acts as the inertial mass that is driven in a particular axis. This embodiment saves the cost of providing a separate inertial mass and saves space and total weight in the device. In other embodiments, however, an actuator and a separate inertial mass can be coupled to a flexure to provide the inertial sensations. Yet other embodiments can use other types of actuators and mechanisms to drive an inertial mass linearly. In still other embodiments, an inertial mass can be driven rotationally. For example, an eccentric mass can be coupled to a rotating shaft of a rotary motor or other rotary actuator and rotated to provide inertial sensations on the housing of the interface device 10 or 300. One embodiment for controlling a unidirectional rotational eccentric mass is described in copending application Ser. No. 09/669,029, filed Sep. 25, 2000, and which is incorporated herein by reference in its entirety. Other methods for providing rotational inertial masses are disclosed in U.S. Pat. No. 6,088,017 and copending application Ser. No. 09/608,125, filed Jun. 30, 2000, and incorporated herein by reference in its entirety.

Inertial forces caused by the motion of the inertial mass are applied to the device housing with respect to the inertial mass (i.e. the inertial mass acts as an inertial ground) instead of with respect to an earth ground, thereby conveying haptic feedback such as tactile sensations to the user who is contacting the housing. Actuator 206 is preferably a DC motor, but can be a different type of rotary actuator in other embodiments. For example, a moving magnet actuator can be used; such an actuator is described in detail in copending patent application Ser. No. 60/133,208, incorporated herein by reference. Other types of actuators can also be used (in any of the embodiments of the present invention), such as a stepper motor controlled with pulse width modulation of an applied voltage, a pneumatic/hydraulic actuator, a torquer (motor with limited angular range), shape memory alloy material (wire, plate, etc.), a piezo-electric actuator, etc.

Figure 5:
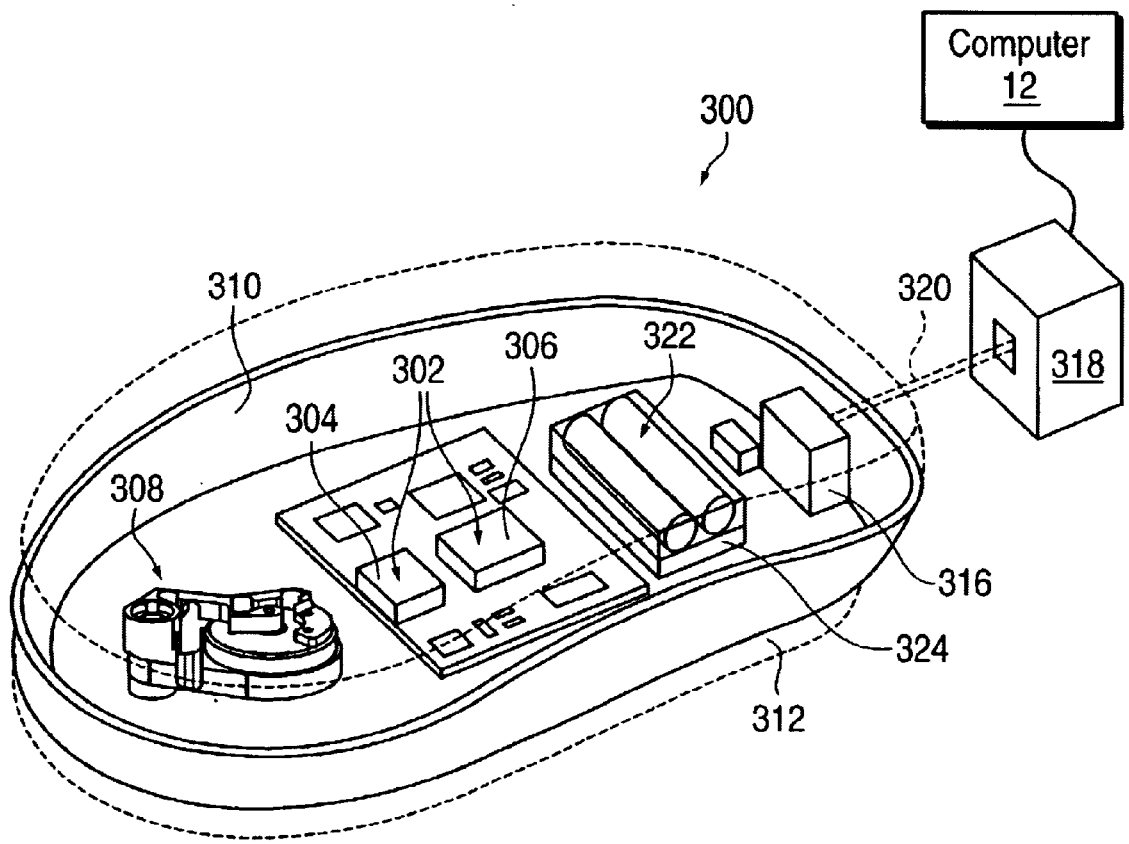
FIG. 5 is a perspective view of a mouse embodiment of the interface device suitable for use with the present invention.

FIG. 5 is a perspective view of a lower portion embodiment of a mouse device 300 suitable for use as device 10 in the present invention (an upper portion of the housing is shown as dashed lines). Mouse 300 can be used to input x- and y-coordinate data to a host computer by moving the mouse in an x-y planar workspace on a tabletop, desk, mousepad, or other flat surface.

Mouse 300 includes an optical sensor device 302, which in the preferred embodiment includes an emitter 304 and detector 306. The emitter 304 emits a beam of electromagnetic radiation, such as infrared or visible light, and the beam is reflected to the detector 306 when the mouse is positioned on a surface. The detector 306 allows multiple pictures of the surface to be taken over time as the mouse is moved, allowing the x-y motion of the mouse to be tracked and sent as locative information to the host computer. Such optical sensing devices are well known for use in mouse-type devices.

A wireless transmitter/receiver 316 can be provided on a preferred embodiment of mouse 300 to transmit locative information and receive wireless electromagnetic signals, such as infrared or radio signals in a beam 320. The mouse transmits locative information and button information, and receives status, haptic feedback, and other command information from the host 12. The beam 320 can be received and sent on the host side by a host transmitter/receiver 318 which is connected to host 12. Other embodiments of the mouse may use a wire or cable to communicate information to and from the host.

An actuator assembly 308 is coupled to the housing 310 of the mouse for outputting inertial sensations on the housing of the mouse 300. Actuator assembly 308 can be similar to assembly 200 of FIG. 4 in some embodiments. In other embodiments, as shown in FIG. 5, an actuator assembly including a single-piece flexure connected to a motor can be used. This embodiment of an actuator assembly is shown in greater detail with reference to FIG. 6. The assembly 308 can output inertial forces in the z-direction, perpendicular to the plane of motion of mouse 300. This is a preferred direction for the sensations since forces in the z-direction will not interfere with the motion or sensor output of the mouse in the x- and y-directions. Furthermore, since the tactile sensations are directed in a third degree of freedom relative to the two-dimensional mouse planar workspace and display screen, jolts or pulses output along the Z-axis feel much more like three-dimensional bumps or divots to the user, increasing the realism of the tactile sensations and creating a more compelling interaction. For example, an upwardly-directed pulse that is output when the cursor is moved over a window border creates the illusion that the mouse is moving "over" a bump at the window border. Alternatively, directed inertial forces can be output along other axes in the planar workspace of the mouse and can be compensated for to prevent or reduce interference with the user's control of the device. For example, an eccentric spinning mass provides inertial forces in several directions in the plane of rotation of the mass.

The mouse can include a flexible layer 312 attached to its underside, which positions the layer 312 between the mouse housing 310 and the surface 314. The flexible layer 312 allows the housing 310 to move with respect to the surface 314, so that the inertial sensations output from the actuator assembly 308 feel stronger to the user. For example, the layer 312 can be made of rubber, foam, or other compliant material, and can have a smooth surface to promote sliding of the mouse on surface 314. Alternatively or additionally, flexible hinges or connecting members can couple the two halves of housing 310. In other embodiments, the layer 312 need not be physically attached to the mouse housing 310, but can be a separate compliant mouse pad or other separate compliant or flexible layer or member.

Mouse 300 also includes one or more batteries 322, which can be of a variety of forms, such as disposable, rechargeable, etc., as explained above for battery 150. As in the embodiment of FIGS. 3a–3b, the batteries 322 are coupled to the mouse housing 310 by a compliant layer 324, which can be made of foam, for example, or other compliant or flexible materials as described above with reference to FIGS. 3a–3b. Layer 324 allows the batteries 322 to be inertially decoupled from the mass of the mouse, allowing haptic sensations of greater magnitude to be output, similarly as explained for device 10 above. Other compliant/ flexible members can be used in other embodiments, as described above. In some embodiments, a special compartment cover or other access mechanism can be provided to allow the user to access the batteries 322 to recharge or exchange them; or, the mouse 300 can be plugged into a recharging docking station to recharge the batteries, as described above with reference to FIGS. 3a–3b. Furthermore, an attachment member, similar to the attachment member 154 of FIG. 3a, can be coupled to the compliant layer 324 and removably attached to the batteries 322 to allow easy removal and reattachment by the user. As with the device 10, the compliant layer 324 can be made of a material such as foam or rubber, or can be a physical spring or other flexible member or device.

Figure 6:
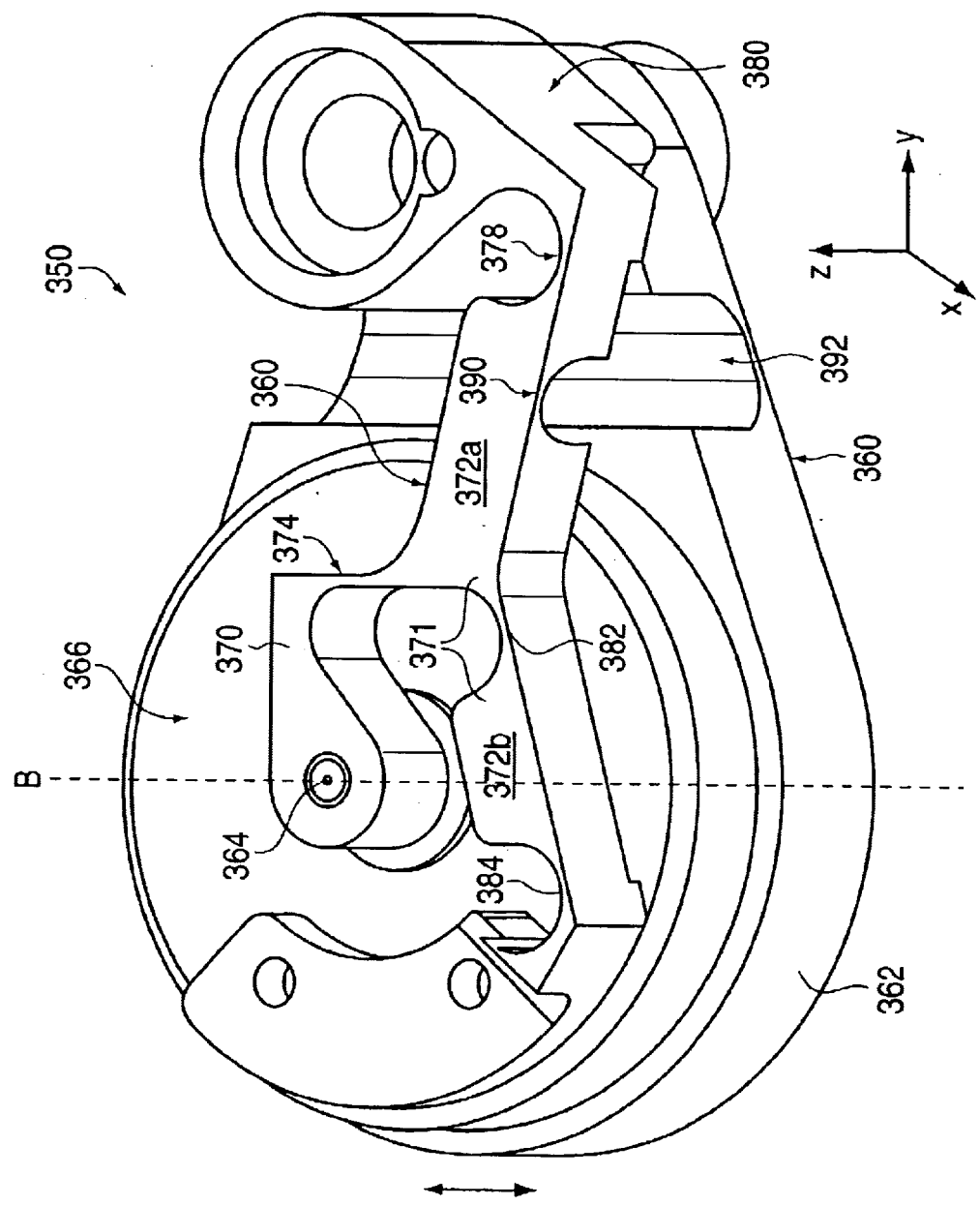
FIG. 6 is a perspective view of another example of an actuator assembly suitable for use with the present invention.

FIG. 6 is a perspective view of one embodiment of an actuator assembly 350 suitable for use with the device 10 or the mouse 300. Actuator assembly 350 is described in greater detail in copending application Ser. No. 09/585,741, which is incorporated herein by reference.

Actuator assembly includes a grounded flexure 360 and an actuator 366 coupled to the flexure 360. The flexure 360 is preferably a single, unitary piece made of a material such as polypropylene plastic ("living hinge" material) or other flexible material. This type of material is durable and allows flexibility of the flex joints (hinges) in the flexure when one of the dimensions of the joint is made small, but is also rigid in the other dimensions, allowing structural integrity as well as flexibility depending on thickness. Flexure 360 can be grounded to the mouse housing 310, for example, at a bottom portion.

Actuator 366 is shown coupled to the flexure 360. The housing of the actuator is coupled to a receptacle portion 362 of the flexure 360 which houses the actuator 366 as shown. Preferably, an amount of space is provided above and below the actuator 366 and receptacle portion 362 to allow motion of the actuator 366 in the z-axis.

A rotating shaft 364 of the actuator is coupled to the flexure 360 and is rigidly coupled to and rotates a central rotating member 370 about axis B. Rotating member 370 is coupled to a first portion 372a of an angled member 371 by a flex joint 374. The first portion 372a is coupled to the grounded portion 380 of the flexure by a flex joint 378 and the first portion 372a is coupled to a second portion 372b of the angled member by flex joint 382. The second portion 372b, in turn, is coupled at its other end to the receptacle portion 362 of the flexure by a flex joint 384. Forces output by the actuator 366 are transmitted to the moveable receptacle portion 362 and to the inertial mass, which in this embodiment is the actuator 366. The actuator 366 is operated in only a fraction of its rotational range when driving the rotating member 370 in two directions, allowing high bandwidth operation and high frequencies of pulses or vibrations to be output. The flex joint 392 allows the receptacle portion 322 (as well as the actuator 66) to move approximately linearly in the z-axis in response to motion of the portions 332a and 332b. A flex joint 390 is provided in the first portion 372a of the angled member 371 to allow the flexing about flex joint 392 in the z-direction to more easily occur. By quickly changing the rotation direction of the actuator shaft 324, the actuator/receptacle portion can be made to oscillate along the z-axis and create a vibration on the mouse housing with the actuator 66 acting as an inertial mass.

In addition, the flex joints included in flexure 360 act as spring members to provide a restoring force toward the origin position (rest position) of the actuator 366 and receptacle portion 362. In some embodiments, the stops can be included in the flexure 360 to limit the motion of the receptacle portion 362 and actuator 366 along the z-axis.

Figure 7:
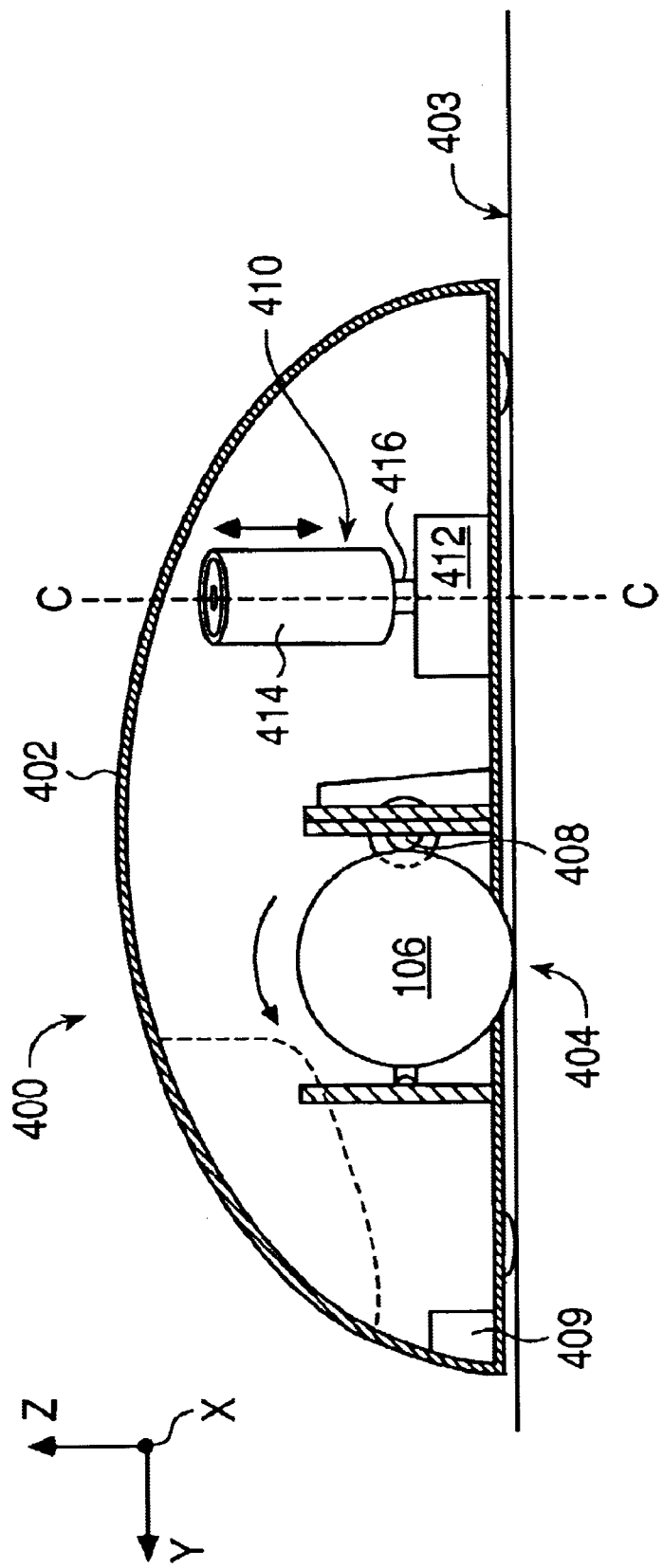
FIG. 7 is a side elevational view of a different embodiment of the present invention in which a battery is used as an inertial mass to provide inertial tactile sensations.

FIG. 7 is a side elevational view of an embodiment 400 of a device 400 in which one or more batteries are used as the inertial mass in a haptic feedback device. Device 400 is shown as a mouse having a mouse housing 402. A sensor 404 for detecting motion of the mouse and for providing x- and y-locative information to the host computer is shown as a ball sensor including a ball 406 and multiple rollers 408 frictionally engaged with the ball 406. The ball engages the surface 403 to roll when the mouse is moved, thereby moving the rollers 408 and allowing optical encoder sensors to detect the movement, as is well known to those of skill in the art. Alternatively, an optical sensor as described with reference to FIG. 6 can be used. A wireless transmitter/receiver 409 can be included to communicate with the host computer as described with reference to the embodiment of FIG. 6; alternatively, a cable can be used.

Mouse 400 also includes an actuator assembly 410, which includes a stationary driving portion 412 and an inertial mass 414, which in the present embodiment is a battery, but may be other types of power storage elements. Battery 414 can be coupled to contacts to allow power to be provided to the driving portion 412. Preferably, the battery can be easily removed and replaced by a user. The battery 414 is oscillated linearly along axis C (parallel to the z-axis, preferably, but not essentially), similarly to other inertial masses in inertial haptic feedback devices to provide inertial forces on the housing of the device 400. For example, a sine wave or other harmonic drive signal can be used to drive the mass harmonically in two directions. Preferably, a small battery is used so that a smaller-sized actuator can be used to drive the mass. Actuator assembly 410 can include a voice coil linear actuator, a DC rotary actuator and flexure as described above, or other type of actuator, the operation of which is well known to those of skill in the art. The actuator assembly 410, or other assembly using one or more batteries as an inertial mass, can also be used in the device 10 of FIGS. 3a and 3b to provide inertial tactile sensations to the user.

While this invention has been described in terms of several preferred embodiments, it is contemplated that alterations, permutations, and equivalents thereof will become apparent to those skilled in the art upon a reading of the specification and study of the drawings. For example, many different types of actuators can be used to output inertial tactile sensations to the user. Furthermore, many of the features described in one embodiment can be used interchangeably with other embodiments. Furthermore, certain terminology has been used for the purposes of descriptive clarity, and not to limit the present invention.

What is claimed is:

1. A haptic feedback device in communication with a host computer, the device comprising:
    a housing;
    a sensor device coupled to said housing, said sensor device operable to detect a movement of at least one of a manipulandum and said housing and to output a sensor signal representative of said movement; and
    an actuator coupled to said housing, said actuator operable to output an inertial force, by moving an inertial mass, said inertial force transmitted through said housing; and
    a power storage element coupled to said housing and operable to provide power to at least one of said actuator and to said sensor device, said power storage element being inertially decoupled from said housing to reduce the mass of said haptic feedback device with respect to said inertial mass.

2. A haptic feedback device as recited in claim 1 wherein said power storage element comprises at least one battery.

3. A haptic feedback device as recited in claim 1 wherein said power storage element is coupled to said housing by a compliant member.

4. A haptic feedback device as recited in claim 3 wherein said compliant member comprises a layer of foam coupled between said power storage element and said housing.

5. A haptic feedback device as recited in claim 4 further comprising an attachment member coupled between said layer of foam and said storage element, wherein said storage element may be detached from said attachment member.

6. A haptic feedback device as recited in claim 3 wherein said compliant member comprises a spring member.

7. A haptic feedback device as recited in claim 2 wherein said at least one battery is rechargeable.

8. A haptic feedback device as recited in claim 7 further comprising a connector coupled to said housing and electrically coupled to said at least one battery, said connector capable of being connected to a recharging device to allow said battery to be recharged.

9. A haptic feedback device as recited in claim 1 further comprising a wireless communication link between said sensor device and said host computer.

10. A haptic feedback device as recited in claim 9 wherein said wireless communication link comprises radio signals.

11. A haptic feedback device as recited in claim 1 wherein said inertial mass is operable to oscillate harmonically in response to a harmonic drive signal.

12. A haptic feedback device as recited in claim 1 wherein said inertial mass is operable to move linearly.

13. A haptic feedback device as recited in claim 1 wherein said inertial mass comprises a spinning eccentric mass.

14. A haptic feedback device as recited in claim 1 wherein said actuator is moved as said inertial mass.

15. A haptic feedback device as recited in claim 1 further comprising a flexure coupled to said actuator, said flexure comprising at least two flex joints.

16. A haptic feedback device as recited in claim 1 wherein said haptic feedback device comprises a gamepad.

17. A haptic feedback device as recited in claim 16 wherein said actuator comprises a first actuator and said inertial mass comprises a first inertial mass, and further comprising a second actuator operable to move a second inertial mass, wherein said first and second actuators are configured to operate in conjunction.

18. A haptic feedback device as recited in claim 1 wherein said haptic feedback device comprises a mouse.

19. A haptic feedback device as recited in claim 18 wherein said actuator is operable to output said inertial force along a z-axis substantially perpendicular to a planar workspace of said mouse.

20. A haptic feedback device as recited in claim 19 wherein said inertial force is correlated with a graphical representation displayed by said host computer, wherein a position of said mouse in said planar workspace corresponds with a position of a cursor displayed in said graphical representation.

21. A haptic feedback device in communication with a host computer, the device comprising:
   a housing;
   a sensor device coupled to said housing, said sensor device operable to detect a movement of at least one of a manipulandum and said housing and operable to output a sensor signal representative of said movement; and
   an actuator coupled to said housing, said actuator operable to output an inertial force by moving an inertial mass; and
   a component coupled to said housing by a compliant member, said component being inertially decoupled from said housing to reduce the mass of said haptic feedback device with respect to said inertial mass.

22. A haptic feedback device as recited in claim 21 wherein said component comprises a power storage element.

23. A haptic feedback device as recited in claim 22 wherein said compliant member comprises a layer of foam coupled between said power storage element and said housing.

24. A haptic feedback device as recited in claim 21 further comprising a wireless communication link between said haptic feedback device and said host computer.

25. A haptic feedback device as recited in claim 21 wherein said inertial mass is operable to oscillate harmonically in response to a harmonic drive signal.

26. A haptic feedback device as recited in claim 21 wherein said inertial mass is operable to move rotationally.

27. A haptic feedback device as recited in claim 21 wherein said actuator is moved as said inertial mass.

28. A method for providing haptic feedback to an interface device, the method comprising:
   detecting motion of said interface device or a manipulandum thereof and providing an indication of said motion to a host computer;
   receiving information from said host computer indicating that a tactile sensation is to be output, said tactile sensation being correlated with an event occurring within a graphical environment; and
   outputting an inertial force with respect to an inertial ground on a housing of said interface device, by oscillating an inertial mass coupled to an actuator, wherein said inertial force is transmitted through said housing, wherein a mass of a power storage element included in said interface device is inertially decoupled from said housing of said interface device.

29. A method as recited in claim 28 wherein said power storage element is inertially decoupled by providing a compliant member between said power storage element and said housing.

30. A method as recited in claim 28 wherein enabling said output comprises moving said inertial mass bi-directionally along an axis to cause said inertial force along said axis.

31. A method as recited in claim 30 further comprising correlating said inertial force with an interaction between a user-controlled cursor and a graphical object displayed in a graphical environment.

32. A method as recited in claim 28 wherein said inertial force comprises a periodic force sensation.

33. A method as recited in claim 32 wherein said periodic force sensation comprises at least one of a frequency and a magnitude which can be specified by said host computer.

34. A method as recited in claim 32 further comprising streaming a sequence of force values to be output as said periodic inertial force from said host computer to said interface device.

35. A tactile feedback device in communication with a host computer, the tactile feedback device comprising:
   a manipulatable object;
   sensing means for detecting a movement of said manipulatable object, said sensing means operable to output a sensor signal representative of said movement, wherein at least one of a position and a motion of said manipulatable object is determined from said sensor signals; and
   force generation means for outputting an inertial force with respect to an inertial ground, wherein said inertial force is generated by oscillating an inertial mass approximately along said axis with respect to said housing, said inertial force transmitted through said housing; and
   power means for providing power to said force generation means, said power means being inertially decoupled from a housing of said tactile feedback device for reducing the mass of said tactile feedback device with respect to said inertial mass.

36. A tactile feedback device as recited in claim 35 wherein said power means is coupled to said housing by a compliant member.

37. A tactile feedback device as recited in claim 35 further comprising a wireless communication means between said sensor device and said host computer.

38. A tactile feedback device as recited in claim 35 wherein said force generation means is operable to output said inertial force along a z-axis substantially perpendicular to a planar workspace of said manipulatable object.

39. A device comprising:
   a housing;
   a first inertial mass disposed in said housing;
   a first actuator coupled to said housing, said first actuator operable to displace said first inertial mass; and
   a component coupled to said housing, said component inertially decoupled from said housing.

40. A device as recited in claim 39, wherein said displacement of said first inertial mass is operable to output an inertial force through said housing.

41. A device as recited in claim 39 wherein said device further comprises a processor in communication with said first actuator.

42. A device as recited in claim 39 wherein said device further comprises a sensor in communication with said housing, said sensor operable to detect a change in position of said housing and to output a sensor signal correlated with said change in position.

43. A device as recited in claim 42 wherein said component comprises a power storage element operable to provide power to at least one of said first actuator and to said sensor.

44. A device as recited in claim 43, wherein said power storage element comprises a battery.

45. A device as recited in claim 43, wherein said first inertial mass comprises said power storage element.

46. A device as recited in claim 39 wherein said component is coupled to a compliant member, said compliant member coupled to said housing.

47. A device as recited in claim 39 wherein said first inertial mass is operable to oscillate harmonically in response to a harmonic drive signal.

48. A device as recited in claim 39 wherein said first inertial mass is operable to be displaced linearly.

49. A device as recited in claim 39 wherein said first inertial mass comprises an eccentric mass, said eccentric mass operable to rotate about an axis.

50. A device as recited as in claim 39 further comprising a flexure coupled to said first actuator.

51. A device as recited in claim 39 further comprising:
   a second inertial mass; and
   a second actuator operable to displace said second inertial mass.

52. A method comprising:
   providing a housing;
   disposing a first inertial mass in said housing;
   coupling a component to said housing, said component inertially decoupled from said housing; and
   coupling a first actuator to said housing, said first actuator operable to displace said inertial mass.

53. A method as recited in claim 52 further comprising:
   coupling a compliant member to said housing; and
   providing a processor in communication with said first actuator.

54. A method as recited in claim 52 further comprising providing a sensor in communication with said housing, said sensor operable to detect a change in position of said housing and to output a sensor signal correlated with said change in position.

55. A method as recited in claim 52 wherein said displacement of said inertial mass is operable to transmit an inertial force through said housing.

56. A method as recited in claim 55, wherein said inertial force comprises a periodic force, said periodic force comprising at least one of a frequency and a magnitude, said processor operable to control said frequency and said magnitude.

57. A method as recited in claim 56 further comprising streaming a plurality of force values, said force values comprising said periodic force.

58. A method as recited in claim 52, wherein said component comprises a power storage element operable to provide power to at least one of said first actuator and to said sensor.

59. A method as recited in claim 58, wherein said power storage element comprises a battery.

60. A method as recited in claim 52, wherein said first inertial mass comprises said power storage element.

61. A method as recited in claim 53 further comprising coupling said component to a compliant member.

62. A method as recited in claim 52 further comprising coupling a flexure to said first actuator.

63. A method as recited in claim 52 further comprising:
   providing a second inertial mass; and
   providing a second actuator operable to displace said second inertial mass.

* * * * *